US006941315B2

(12) United States Patent
Goldstein et al.

(10) Patent No.: US 6,941,315 B2
(45) Date of Patent: Sep. 6, 2005

(54) MULTIDIMENSIONAL DATA OBJECT SEARCHING USING BIT VECTOR INDICES

(75) Inventors: Jonathan D. Goldstein, Bellevue, WA (US); John C. Platt, Redmond, WA (US); Christopher J. C. Burges, Bellevue, WA (US)

(73) Assignee: Microsoft Corp., Redmond, WA (US)

( * ) Notice: Subject to any disclaimer, the term of this patent is extended or adjusted under 35 U.S.C. 154(b) by 185 days.

(21) Appl. No.: 10/602,438

(22) Filed: Jun. 23, 2003

(65) Prior Publication Data

US 2004/0260727 A1 Dec. 23, 2004

(51) Int. Cl.[7] .............................................. G06F 17/30
(52) U.S. Cl. ..................... 707/101; 707/100; 707/102; 707/104; 707/3
(58) Field of Search ........................... 707/3, 100, 101, 707/102, 104, 1, 2, 5, 7

(56) References Cited

U.S. PATENT DOCUMENTS

| | | | | |
|---|---|---|---|---|
| 5,499,360 A | * | 3/1996 | Barbara et al. ................. | 707/5 |
| 5,781,906 A | * | 7/1998 | Aggarwal et al. ........... | 707/102 |
| 6,122,628 A | * | 9/2000 | Castelli et al. .................. | 707/5 |
| 6,134,541 A | * | 10/2000 | Castelli et al. .................. | 707/2 |
| 6,490,532 B1 | * | 12/2002 | Hogue et al. .................. | 702/27 |
| 6,778,981 B2 | * | 8/2004 | Lee et al. ........................ | 707/3 |
| 2003/0061213 A1 | * | 3/2003 | Yu et al. ......................... | 707/7 |
| 2003/0097356 A1 | * | 5/2003 | Lee et al. ....................... | 707/3 |
| 2003/0236789 A1 | * | 12/2003 | Agrawal et al. ............ | 707/100 |
| 2004/0024738 A1 | * | 2/2004 | Yamane ......................... | 707/1 |

OTHER PUBLICATIONS

Katayama, Norio; Satoh, Shin'ichi; "The SR–Tree: An Indes Structure for High–Dimensional nearest Neighbor Queries" Apr. 1997; ACM Arizona, USA; pp. 369–380.

Gaede, Volker; Gunther, Oliver; "Multidimensional Access Methods"; ACM Computing Surveys, vol. 30, No. 2, Jun. 1998; pp. 170–231.

Goldstein, Johnathan; Ramakrishnan, Raghu; "Contrast Plots and P–Shere Trees: Space vs. Time in Nearst Neighbor Searches"; VLDB Conference, Cairo, Egyp, 2000; 12 pages.

Berchtold, Stefan; Keim, Daniel A.; Kriegel, Hans–Peter; "The X–tree: An index for High–Dimensional Data"; VLDB Conference, Mumbai, India, 1996; pp. 28–39.

Hjaltason, Glsli R.; Samet, Hanan; "Ranking in Spatial Databases"; University of Maryland, pp. 83–95.

Funkhouser, Thomas; Min, Patrick; Kazhdan, Michael; Chen, Joyce; Halderman, Alex; Dobkin, David; Jacobs, David; "A Search Engine for 3D Models"; ACM Transactions on Graphics, vol. V., No. N; 28 Pages; 2002.

Kriegel, Hans–Peter, Potke, Marco; Seidl, Thomas; "Object–Relational Indexing for General Interval Relationships"; 21 pages; Germany, 2001.

Kamel, Ibrahim; Faloutsos, Christos; "Hilbert R–tree: An Improved R–tree Using Fractals"; VLDB Conference; pp. 500–509; Santiago, Chile; 1994.

(Continued)

*Primary Examiner*—Jean M. Corrielus
(74) *Attorney, Agent, or Firm*—Lee & Hayes, PLLC

(57) ABSTRACT

Prior to searching a multidimensional feature space populated with data objects, each dimension in the feature space is divided into a number of intervals. When a query is received, a single interval that is overlapped by the query is selected from each dimension. A reduced set of data objects is then selected that includes only those data objects that overlap the selected intervals. This reduced set of data objects, rather than the entire set of data objects in the feature space, is then used to determine matches for the query.

15 Claims, 7 Drawing Sheets

OTHER PUBLICATIONS

Hellerstein, Joseph M.; Naughton, Jeffrey F.; Pfeiffer Avi; "Generalized Search Trees for Database Systems"; VLDB Conference; pp. 562–573; Zurich, Switzerland; 1995.

O'Neil, Patrick; Quass, Dallan; "Improved Query Performance with Variant Indexes"; SIGMOD 1997; pp. 38–49; Arizona.

Guttman, Antonin; "R–trees: A Dynamic Index Structure for Spatial Searching" ACM; pp. 47–57; 1984.

Weber, Roger; Schek, Hans–J; Blott, Stephen; "A Qantitative Analysis and Performance Study for Similarity–Search Methods in High–Dimensional Spaces"; VLDB Conference; pp. 194–205;1998; New York, USA.

Burges, Christopher J.C.; Platt, John C.; Jana, Soumya; "Extracting Noise–Robust Features from Audio Data" IEEE; pp. I–1021 to I–1024; 2002.

Beyer, Kevin; Goldstein, Johnathan; Ramakrishnan, Raghu; Shaft, Uri; "When is Nearest Neighbor Meaningful?"; 19 Pages; Madison, Wisconsin, USA.

Rui, Yong; Huang, Thomas S.; and Chang, Shih–Fu; "Image Retrieval: current Techniques, Promising Directions and Open Issues" Journal of Visual Communications and Image Representation, vol. 10, No. 4, 1999; 17 pages.

Pagel, Bernd–Uwe; Korn, Flip; and Faloutsos, Christos; "Deflating the Dimensionality Curse Using Multiple Fractal Dimensions"; pp. 1–10, ICDE 2000.

H. Edelsbrunner; Maurer, H.A.; "On the Intersection of Orthogonal Objects"; Information Processing Letters, v13, n4 & 5; North Holland, Aug., 1981; pp. 177–181.

Bromley, J.; Bentz, J.W.; Bottou, L.; Guyon, I.; Lecun, Y.; Moore, C.; Sackinger, E.; Shah, R.; "Signature Verification Using a 'Siamese' Time Delay Neural Network"; Advances in Neural Processing Systems, v6; 1994; pp. 25–44.

O'Neil, Patrick; "Model 204 Architecture and Performance"; High Performance Transaction Systems Workshop; Sep. 1987; pp. 40–59.

* cited by examiner

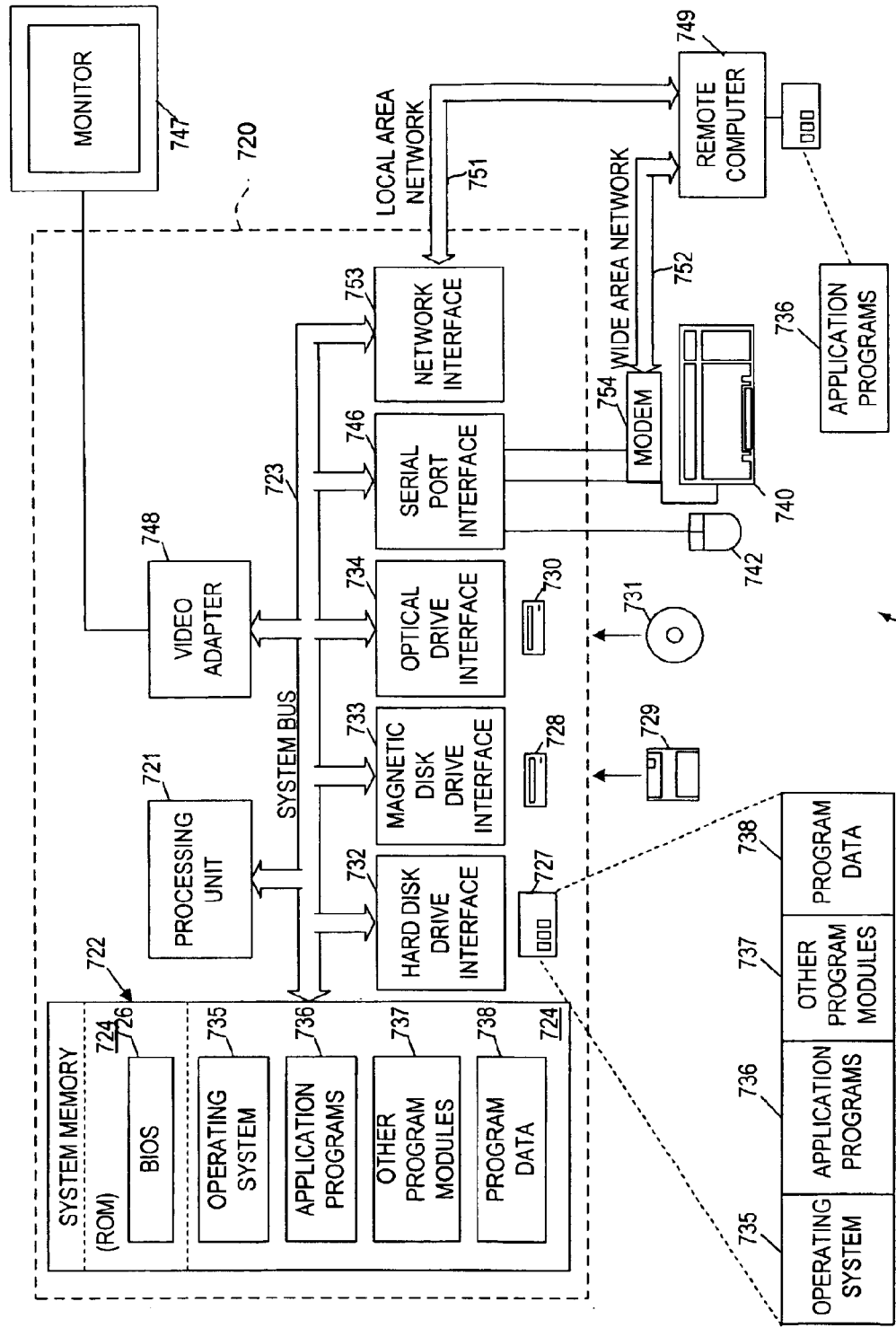

MULTIDIMENSIONAL DATA OBJECT SEARCHING USING BIT VECTOR INDICES

BACKGROUND

A number of strategies have been proposed for identifying and retrieving multimedia data objects stored in a database. At the heart of each of these strategies is a search problem, where a query point is compared to a set of multidimensional (MD) objects in the database. For example, a sample of a song having multiple characteristics (dimensions) may be compared to a number of songs stored in a database to find a song or songs having the same or similar characteristics. As a result of the search, either one or more matches are found, or no match exists in the set of objects in the database. These search problems are usually framed as some form of high dimensional search, where data and query points are mapped into the same high dimensional feature space. For a particular query point, a match is found by finding a data point in the feature space which is close enough to the query point to be considered a match. More specifically, these approximate matching problems are usually framed as epsilon distance queries using some $L_p$ metric, such that the epsilon used is significantly less than the average interpoint distance.

Traditional query processing strategies for solving such problems (e.g. nearest neighbor, epsilon range searching), suffer poor performance due to intrinsic difficulties associated with high dimensionality. These traditional query processing strategies become even more problematic when different matching distances are used for different data points, which turns out to be a very important case for complex high dimensional searches, such as audio fingerprinting and the like. As a result, the most straightforward approach towards solving such problems, linear scan, has typically outperformed more sophisticated approaches. Unfortunately, while simple linear scanning typically achieves better performance with respect to complex high dimensional searches than more complex query processing strategies, linear scanning is a very time intensive process.

SUMMARY

Described herein are various systems and methods that facilitate rapid searching of MD data objects in an MD feature space. In accordance with one embodiment, prior to searching, each dimension in the MD feature space is divided into a number of intervals. When a query point is received, a single interval that overlaps the query point is selected from each dimension. A reduced set of MD data objects is then selected that includes only those MD data objects that overlap the selected intervals. This reduced set of MD data objects, rather than the entire set of MD data objects in the feature space, is then used to determine matches for the query point, thereby greatly increasing the efficiency of the search process.

BRIEF DESCRIPTION OF THE DRAWINGS

FIG. 7 illustrates one embodiment of a computing system in which the data mapping and searching system of FIG. 1 and the operations flows of FIGS. 4–6 may be implemented.

DETAILED DESCRIPTION

In general, the systems and methods described herein relate to, or may be used in conjunction with, searching a plurality of multidimensional (MD) data objects to determine which one or ones of the MD data objects overlap a given query point. In accordance with various embodiments, MD data objects are represented as hyper-rectangles in a feature space. If the MD data objects to be searched are not hyper-rectangles, the MD data objects are first mapped to hyper-rectangles in a feature space. To facilitate rapid searching of the hyper-rectangles, each dimension in the feature space is first divided into a number of predetermined intervals. A bit vector index is then created for each interval in each dimension. Each bit vector index indicates whether each of the hyper-rectangles in the feature space does or does not overlap the interval associated with the bit vector.

When a query point is received, a single interval that overlaps the query point is selected from each dimension. The bit vector indices associated with each of the selected intervals are then logically ANDed together to form a single result bit vector index. The result bit vector index identifies a reduced set of hyper-rectangles within the feature space. This reduced set of hyper-rectangles, or MD data objects approximated by the hyper-rectangles in the reduced set, may then be quickly searched using a linear scan to determine a match or matches for the query point.

Figure 1:
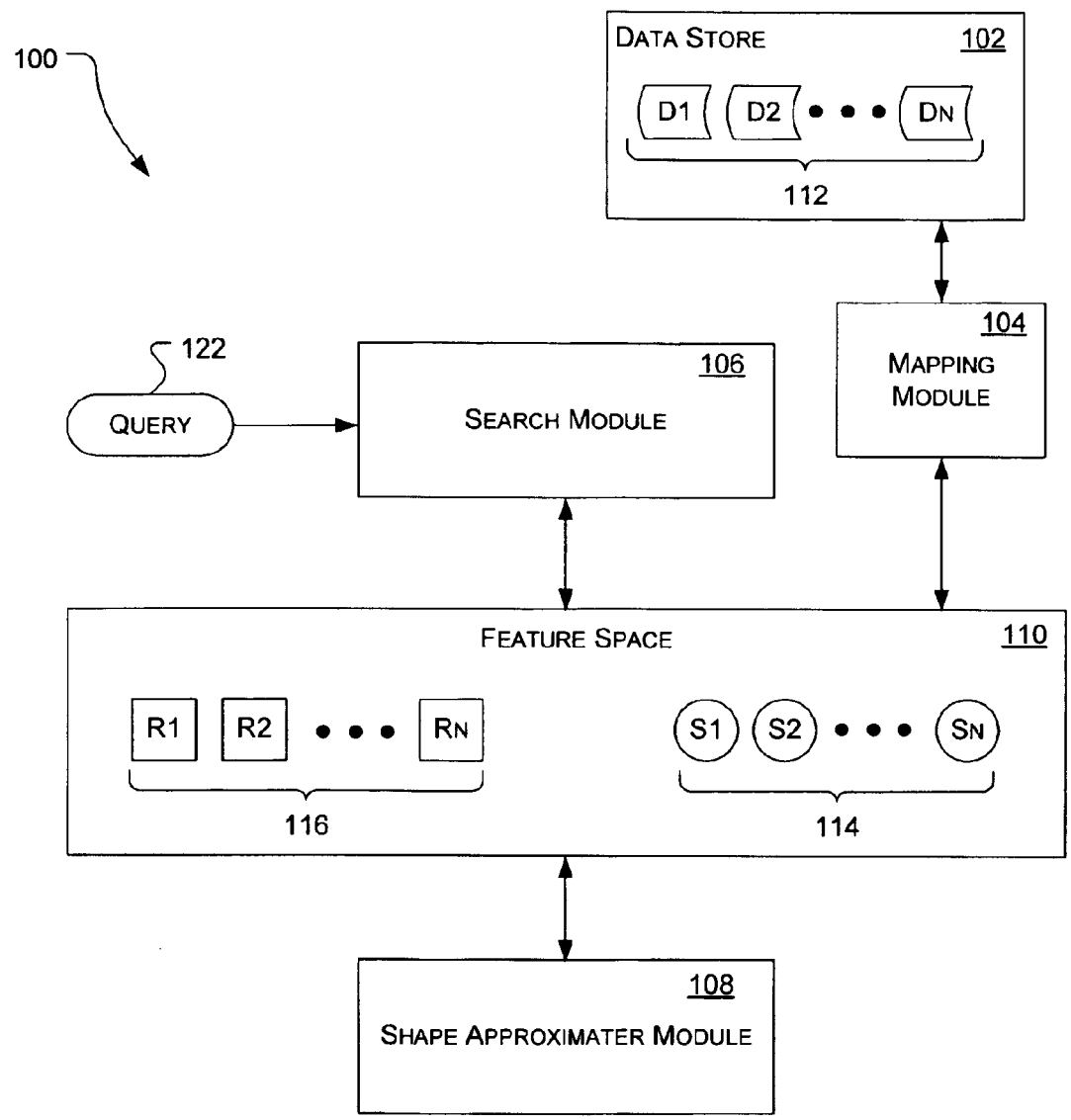
FIG. 1 illustrates an exemplary data mapping and searching system.

Turning now to FIG. 1, illustrated therein is one embodiment of an exemplary data mapping and searching system 100. As shown, the searching system 100 includes a data store 102, a mapping module 104, a search module 106, a shape approximater module 108, and an MD feature space 110. Included in the data store 102 are a number of data items 112 ($D_1$ through $D_n$). Coupled to the MD feature space 110 are a number of MD data objects of a first type 114 ($S_1$ through $S_n$) and a number of MD data objects of a second type 116 ($R_1$ through $R_n$).

In accordance with one implementation, the MD feature space 110 is a type that is used for mapping, manipulating, storing, and/or accessing MD data points or objects in a computing system or computing process. In accordance with this implementation, MD data points in the MD feature space 110 are vectors of values. These vectors have length equal to the number of dimensions in the MD feature space. The precise form and meaning of each index in these vectors may vary, depending on the form of the MD feature space. In accordance with this implementation, the MD data objects 114 and 116 are sets of MD data points. The MD data objects 114 and 115 may be defined as functions or algorithms that determine whether an MD data point is a member of the set of data points defined by the MD object. As used herein, an MD data object is said to be "coupled to" an MD feature space when the underlying function or algorithm that defines the MD object manipulates vectors whose type corresponds to the MD feature space.

Those skilled in the art will appreciate that MD data points and objects may be described or defined in terms of geometry. In accordance with this geometric definition, MD data point vectors are considered coordinates in a high-dimensional space. MD data objects are sets of MD data points, hence may be considered to be shapes or regions in this high-dimensional space. As such, MD data points or objects are referred to herein as being "in" or "within" or "coupled to" an MD feature space. An MD feature space is said to "include" an MD data point or object.

With respecting to searching in the MD feature space 112, an MD data point that is subject to search is referred to herein as a query point. An MD data object is said to overlap a query point if the query point is a member of the set of MD data points that make up the MD data object. This set membership can be determined by applying the underlying function or algorithm of the MD object to the query point. Further, an MD data object is said to match the query point if the MD data object is likely to overlap the query point. Matching is therefore an approximation to overlap. The phrase "searching a feature space" is used herein to describe performing matching and overlap operations of MD data points and objects that are coupled to the MD feature space.

In general, the search module 106 is operable to determine which of the data items 112 in the data store 102 matches a given query point 122. However, as explained in detail below, the search module 106 does not search the data items 112 in data store 102 directly. Rather, the data items 112 are first mapped to MD data objects in the feature space 110 by the mapping module 104. The search module 106 then evaluates the query point and the MD data objects in the feature space 110 to determine which MD data objects match the query point 122.

In accordance with one implementation, the mapping module 104 maps the data items 112 directly to MD data objects of a second type 116. It is then with respect to the MD data objects of the second type 116 that the search module 106 conducts the search. In accordance with another implementation, the mapping module 104 maps the data items 112 to MD data objects of the first type 114. In this embodiment, the shape approximater module 108 then converts or maps the MD data objects of the first type 114 to MD data objects of the second type 116. The search module 106 then conducts the search with respect to the MD data objects of the second type 116 and/or the MD data objects of the first type 114.

In accordance with one embodiment, the data store 102 is composed of or includes computer-readable media. For example, and without limitation, in accordance with one implementation, the data store 102 is a database having data objects stored on a computer-readable media, such as magnetic or optical media. As used herein, computer-readable media may be any available media that can store and/or embody data and/or computer executable instructions, and that may be accessed by a computing system or computing process. Computer-readable media may include, without limitation, both volatile and nonvolatile media, removable and non-removable media, and modulated data signals. The term "modulated data signal" refers to a signal that has one or more of its characteristics set or changed in such a manner as to encode information in the signal.

In accordance with one implementation, each of the data items 112 in the data store 102 is a data sample or file. For example, and without limitation, in accordance with one implementation, each of the data items 112 is a media sample or file, such as an audio or video sample or file. In accordance with other implementations, the data items 112 may be other types of samples or files.

In general, the mapping module 104 is operable to map data items 112 in the data store to MD data objects in the feature space 108. As previously noted, the data items 112 may be mapped either as MD data objects of the first type 114 or as MD data objects of a second type 116. However, as described in greater detail below, the mapping module 104 will typically map data items 112 to MD data objects of the first type 114.

Those skilled in the art will appreciate that there are many different types (shapes) and sizes of MD data objects. Two common types of MD data objects are hyper-spheres and hyper-rectangles. Other types of MD data objects are, without limitation, hyper-ellipsoids or polytopes.

As explained in greater detail below, in accordance with various embodiments described herein, the MD data objects of a first type 114 are hyper-spheres and the MD data objects of a second type 116 are hyper-rectangles. As such, for simplicity, the MD data objects of the first type 114 will be referred to herein as hyper-spheres and the MD data objects of the second type 116 will be referred to herein as hyper-rectangles. However, it should be understood that the various methods and systems described herein may be equally applicable where the MD data objects of the first type are other varieties of MD data objects.

A hyper-rectangle may be defined as a set of all points in an MD feature space such that each point has a value in each dimension in the feature space, the value lying between a minimum and a maximum value per dimension. A hyper-sphere may be defined as a set of all points in an MD feature space such that each point has Euclidean distance to a fixed point less than or equal to a threshold. The fixed point is known as the center of the hyper-sphere.

Figure 2:
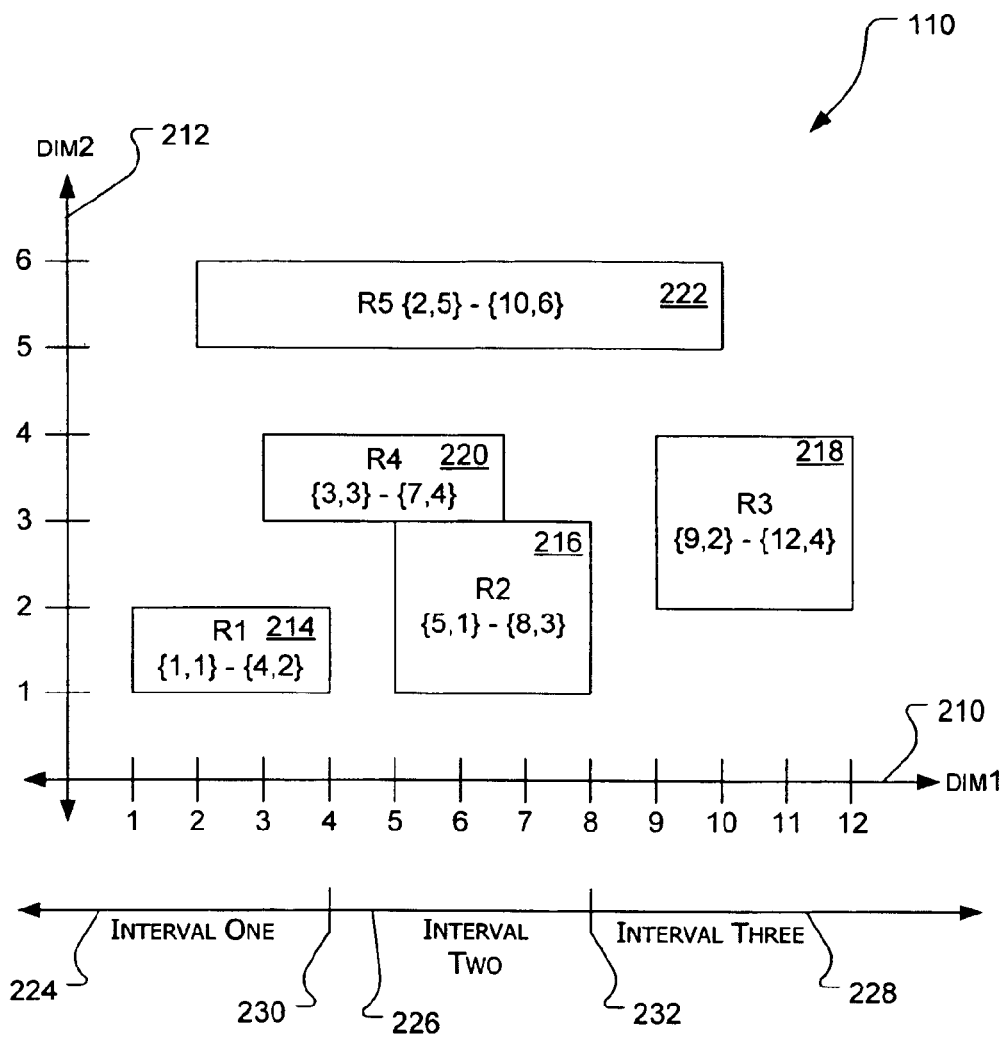
FIG. 2 illustrates an exemplary feature space of the data mapping and searching system of FIG. 1.

Turning to FIG. 2, illustrated therein is a generalized exemplary representation of the feature space 110 including a number of hyper-rectangles 214–222. To simplify presentation, a 2-dimensional feature space including 2-dimensional hyper-rectangles is shown. However, it should be understood that the feature space 110, and the hyper-rectangles included therein, may have any positive number of dimensions.

As shown in FIG. 2, the feature space 110 has a first dimension (dim1) 210 and a second dimension (dim2) 212. As previously noted, each dimension in a feature space 110 can attain a range of possible values. This range of possible values is shown along each dimension. While only positive integer values are shown along the dimensions 210 and 212 in FIG. 2, it will be appreciated that each dimension may also include negative values and floating point values. Likewise, it should be appreciated that while only hyper-rectangles having positive integer value ranges are shown in FIG. 2, hyper-rectangles that have value ranges that extend into negative values, hyper-rectangles having only negative value ranges, or hyper-rectangles having floating point value ranges are also possible.

A number of different conventions may be used in specifying the size and location of the hyper-rectangles in a feature space 110. FIG. 2 illustrates one exemplary convention that may be used in specifying the size and location of the hyper-rectangles in the feature space 110. In particular, each hyper-rectangle in the feature space 110 includes an identifier (R1, R2, . . . , etc.) and two coordinate pairs. As shown, the first coordinate pair identifies the location of the lower left corner of the hyper-rectangle and the second coordinate pair indicates the upper right corner of the hyper-rectangle with respect to the feature space 110. For example, the lower left most hyper-rectangle 214 in the feature space is designated as R1 {1,1}–{4,2}. In this example, R1 indicates the hyper-rectangle identifier, {1,1} indicates the lower left corner of the hyper-rectangle 214, and {4,2} indicates the upper right corner of the hyper-rectangle 214. As will be appreciated, the ranges of the attributes of the hyper-rectangles R1 through R5 along dimensions one and two may be determined from these ordered pairs.

Returning now to FIG. 1, in accordance with one implementation, the search module 106, the mapping module 104, and the shape approximater module 108 are each composed of, or include, computer executable instructions. In accordance with one implementation these computer executable instructions are stored or embodied in one or more types of computer-readable media and are executed by one or more computing processes or devices, such as shown and described below with respect to FIG. 7.

It should be understood that while the search module 106, the mapping module 104, and the shape approximater module 108 are described herein as comprising or including computer executable instructions embodied in computer-readable media, the search module 106, the mapping module 104, the shape approximater module 108, and any or all of the functions or operations performed thereby, may likewise be embodied all or in part as interconnected machine logic circuits or circuit modules within a computing device. Stated another way, it is contemplated that the search module 106, the mapping module 104, the shape approximater module 108, and their operations and functions, may be implemented as hardware, software, firmware, or various combinations of hardware, software, and/or firmware.

In general, as previously described, the shape approximater module 108 is operable to map or convert hyper-spheres 114 to hyper-rectangles 116 in the feature space 110. The manner in which this mapping is accomplished by the shape approximater module 108 may vary, based on the type of hyper-sphere 114 that is being mapped or converted. For example, and without limitation, in accordance with one implementation, each hyper-sphere 114 is mapped to a hyper-rectangle 116 having a size that completely encloses the hyper-sphere 114. For example, a hyper-sphere 114 may be mapped to a hyper-rectangle 116 having dimensions such that if the hyper-sphere 114 were positioned in the center of the hyper-rectangle 116, the hyper-sphere 114 would be completely contained within the hyper-rectangle 116. As such, it will be appreciated that the overall size or volume of a hyper-rectangle will be dependent on the overall size or volume of the hyper-sphere from which it is mapped.

In one implementation, each hyper-rectangle 116 will be the smallest possible hyper-rectangle that would completely enclose the hyper-sphere 114 from which it is mapped. In other implementations, if false negative search results are permissible, each hyper-rectangle 116 may be the smaller than the smallest possible hyper-rectangle that would completely enclose the hyper-sphere 114 from which it is mapped.

It should be understood, that while the hyper-rectangles 116 have been described as being mapped from hyper-spheres in the feature space 110 using the shape approximater module 108, in accordance with other embodiments, the hyper-rectangles 116 in the feature space may be created in, or mapped to, the feature space 110 using other modules or systems or mapping techniques.

In general, the search module 106 performs searches of the feature space 110 to identify hyper-rectangles that overlap a given query point 122. Given that a hyper-rectangle is an MD data object, the definition of overlapping and matching a hyper-rectangle is described, above. In accordance with one implementation, the search module 106 performs the operations illustrated in FIGS. 3, 4, 5, and/or 6, as will now be described.

Figure 3:
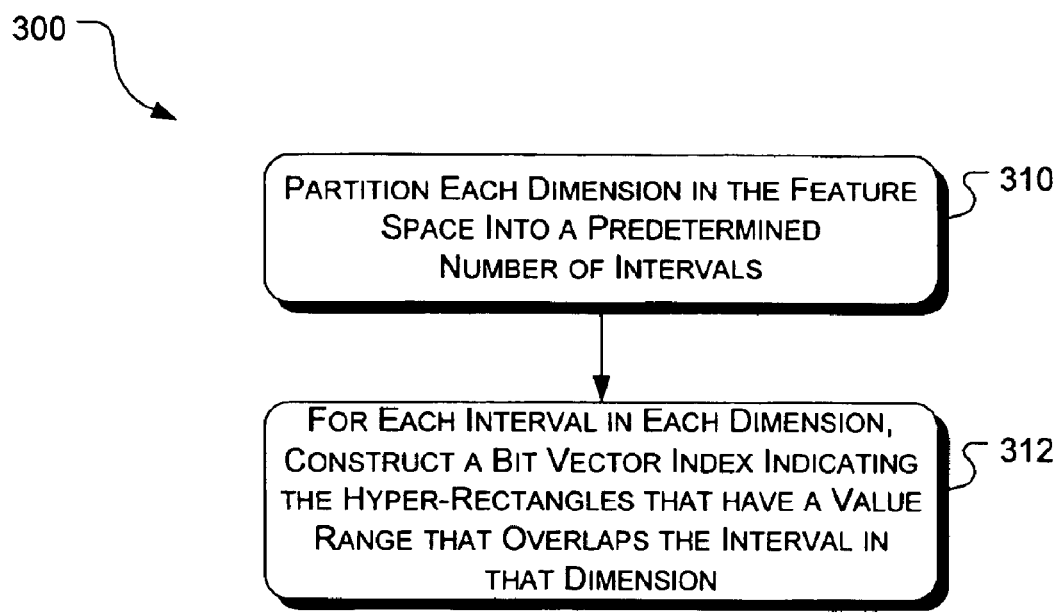
FIG. 3 is an exemplary operational flow diagram illustrating various operations that may be performed in preparation for searching the feature space of FIG. 2.

Turning first to FIG. 3, illustrated therein is an exemplary operational flow including operations 300 that may be performed by the search module prior to searching the feature space 110. In accordance with one implementation, the operations 300 are performed once the feature space 110 has been populated with hyper-rectangles 116. As described in greater detail below, the operations 300 create a set of bit vector indices that are used during the search process. The operations 300 may be performed at various times. Typically, however, the operations 300 will not be performed before each search operation. Rather, the operations 300 will typically be performed when a large number of hyper-rectangles 116 have been added or removed from the feature space 110. For example, the operations 300 may only be performed after a given number of modifications have taken place with respect to the bit vector indices.

As shown in FIG. 3, at the start of the operational flow 300, a partition operation 310 partitions each dimension in the feature space 110 into a number of disjoint intervals. For example, as shown in FIG. 2, both dimensions 210 and 212 have both been partitioned into three disjoint intervals. As shown, dimension one 210 has been partitioned into interval one, which encompasses all values in dimension one 210 below the value 4; interval two 226, which encompasses all values in dimension one between values 4 and 8; and interval three 228, which encompasses all values in dimension one above value 8. While not specifically shown, dimension two, and any other dimensions in the feature space 110, would be partitioned in a similar manner.

The precise manner in which the starting and ending points of the intervals are determined may vary, and may be dependent on such things as hyper-rectangle distribution and/or hyper-rectangle size. For example, and without limitation, in accordance with one implementation, when m intervals are desired, m−1 divisions or interval dividers are selected between the intervals. For example, as shown in FIG. 2, three intervals require the selection of two interval dividers (3−1=2). In accordance with this implementation, the first and last interval in each dimension will be unbounded on one side. For example, as shown in FIG. 2, interval one 210 is bounded on one side by value 4, but remains unbounded at its other side. Similarly, interval two 212 is bounded on one side by value 8, but remains unbounded at its other side.

In accordance with one implementation, the position of each interval divider is selected such that it falls either at the beginning or end (boundary) of a value range of one of the hyper-rectangles in the feature space. For example, as shown in FIG. 2, the divider 230 between interval one 224 and interval two 226 occurs at the end of the value range of R1 214 along dimension one 210. Similarly, the divider 232 between interval two 225 and interval three 228 occurs at the end of the value range of R2 216 along dimension one 210.

In accordance with one implementation, the locations of the interval dividers are determined as follows. Assuming |S| equals the number of hyper-rectangles in the feature space, m is the desired number of intervals, a/b is used to represent division of b into a with integer truncation, a % b represents the remainder of the division a/b, and k=(2*|S|)% m.

$$\text{FirstIDs}_j = j^*[(2^*|S|)/m] + j \quad 1 <= j <= k \qquad \text{Equation(1)}$$

$$\text{RemainingIDs}_j = j^*[(2^*|S|)/m] + k \quad k+1 <= j <= m \qquad \text{Equation (2)}$$

Equation (1) gives the IDs (where ID=n is the $n^{th}$ smallest hyper-rectangle boundary along the axis) of the first k of the m dividers [j=1 to k] relative to the minimum boundary ID and sorted in increasing order. Equation (2) gives the IDs of the remaining dividers. For instance, if $FirstIDs_1$=5, then the first divider is at the $5^{th}$ smallest hyper-rectangle boundary along the axis. In this implementation, the idea is to allocate approximately equal numbers of MD data objects to each interval, since this ultimately results in more efficient search.

Using Equations (1) with respect to the feature space and hyper-rectangles shown in FIG. 2, it can be seen that k=(2*5)%3=1. Therefore $FirstIDS_1$=1*[(2*5)/3]+1=4. The first division is then at the $4^{th}$ rectangle boundary (where the boundaries are sorted in increasing order). Using Equations (2) with respect to the feature space and hyper-rectangles shown in FIG. 2, it can be seen that $RemainingIDs_2$=2*[(2*5)/3]+1=7. Therefore, the second division is at the $7^{th}$ rectangle boundary. Since the $4^{th}$ and $7^{th}$ boundaries are at 4 and 8 respectively, this is where the dividers are located. In accordance with one embodiment, a restricted set of rectangle boundaries is used based upon prior knowledge of query point distributions. This restricted set of boundaries would then be used in a manner identical to what has been described.

Following the partitioning operation 310, a bit vector indices construction operation then constructs a bit vector index corresponding to each interval in each dimension. In particular, for each interval, a bit vector index is created that specifies whether or not each of the hyper-rectangles 116 in the feature space 110 overlaps the interval. A hyper-rectangle 116 may be said to overlap an interval in a dimension if all or a part of its value range lies within the value range specified by the interval. For example, with respect to FIG. 2, each of hyper-rectangles R1 214, R4 220, and R5 222 overlaps interval one 224; each of hyper-rectangles R2 216, R4 220, and R5 222 overlaps interval two 226; and each of hyper-rectangles R3 218 and R5 222 overlaps interval three 224.

In accordance with one embodiment, each bit vector index includes the same number of bits as there are hyper-rectangles in the feature space. Furthermore, each bit in the bit vector index is associated with a single one of the hyper-rectangles in the feature space. In accordance with another embodiment, bit vectors may include a greater number of bits than hyper-rectangles. For example, in one embodiment, when a hyper-rectangle is removed from the feature space, its associated bit may simply be set to "0", rather than being removed from the bit vector index.

Each bit in a bit vector index indicates whether or not the hyper-rectangle to which it is associated overlaps the interval associated with the bit vector index. For example, a bit having a value of "1" might indicate that its associated hyper-rectangle overlaps the interval associated with the bit vector index, and a bit having a value of "0" might indicate that its associated hyper-rectangle does not overlap the interval associated with the bit vector index. For example, with respect s to FIG. 2, a first bit vector index associated with Interval one 224 includes five bits and may be written as [1 0 0 1 1], where the first bit (1) indicates that R1 overlaps interval one, the second bit (0) indicates that R2 does not overlap interval one, the third bit (0) indicates that R3 does not overlap interval one, the fourth bit (1) indicates that R4 overlaps interval one, and the fifth bit (1) indicates that R5 overlaps interval one. Using this convention, the bit vector index associated with interval two 226 is [0 1 0 1 1], and the bit vector index associated with interval three 228 is [0 0 1 0 1].

Figure 4:
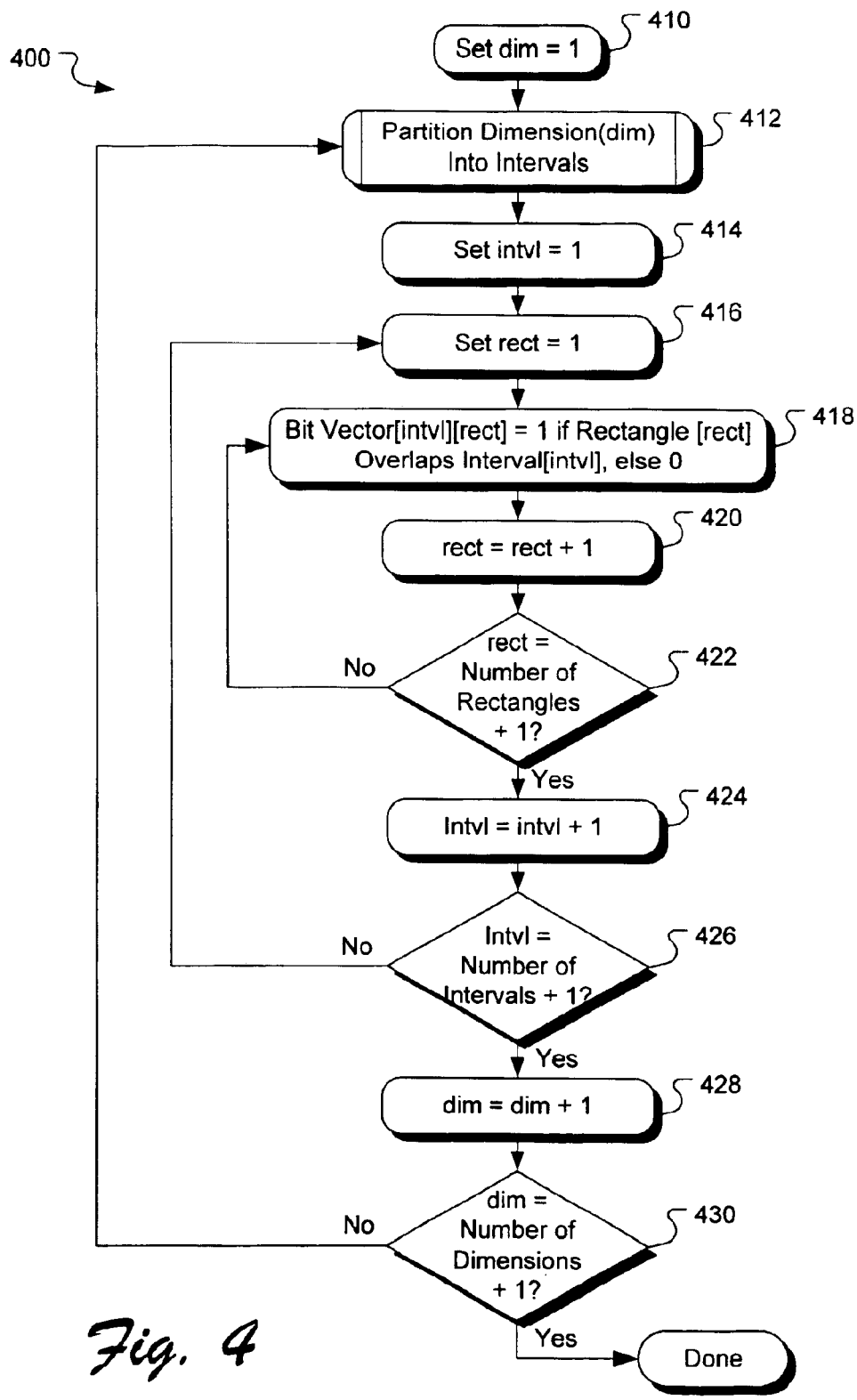
FIG. 4 is another exemplary operational flow diagram illustrating various operations that may be performed in preparation for searching the feature space of FIG. 2.

Turning now to FIG. 4, illustrated therein is a detailed exemplary operational flow 400 including operations that may be used for constructing bit vector indices for the feature space 110. It will be appreciated that the operational flow 400 is operable to handle the construction of bit vector indices for any number of dimensions in the feature space 110 and any number of dimension intervals.

As shown, at the start of the operation flow 400, a dimension set operation 410 sets or initializes a dimension variable (dim) to a value of 1. Following the dimension set operation 410, a partition dimension operation 412 partitions the dimension "dimension(dim)" into intervals, as described above. As will be appreciated, since the dimension variable dim is currently set to 1, the partition dimension operation 412 will partition the first dimension of the given feature space. Following the partition dimension operation 412, a set interval operation 414 sets or initializes an interval variable intv1 to a value of 1. Next, a set hyper-rectangle operation 416 sets or initializes a hyper-rectangle variable rect to a value of 1.

Following the set hyper-rectangle operation 416, a set bit operation 418 determines if the hyper-rectangle specified by the hyper-rectangle variable rect overlaps the interval specified by the interval variable intv1, in the dimension specified by the dimension variable dim. If it is determined that the specified hyper-rectangle overlaps the specified interval in the specified dimension, the set bit operation 418 sets a bit associated with the specified hyper-rectangle in a bit vector index associated with the specified interval in the specified dimension to 1. If, however, it is determined that the specified hyper-rectangle does not overlap the specified interval in the specified dimension, the set bit operation 418 sets a bit associated with the specified hyper-rectangle in a bit vector index associated with the specified interval in the specified dimension to 0.

Next, an increment hyper-rectangle operation 420 increments the hyper-rectangle variable rect. A rectangle number determination operation 422 then determines if the hyper-rectangle variable rect is equal to the number of hyper-rectangles in the feature space plus 1. If the hyper-rectangle variable rect is not equal to the number of hyper-rectangles in the feature space, the operational flow 400 returns to the set bit operation 418. However, if the hyper-rectangle variable rect is equal to the number of hyper-rectangles in the feature space plus 1, the operational flow 400 proceeds to an increment interval operation 424, where the interval variable intv1 is incremented.

Following the increment interval operation 424, an interval determination operation 426 determines if the interval variable intv1 equals the number of intervals in the dimension specified by dimension variable dim plus 1. If the interval variable intv1 does not equal the number of intervals in the dimension specified by dimension variable dim plus 1, the operational flow returns to the set hyper-rectangle operation 416. However, if the interval variable intv1 does equal the number of intervals in the dimension specified by dimension variable dim plus 1, the operational flow proceeds to an increment dimension operation 428, where the dimension variable dim is incremented.

Following the increment dimension operation 428, a dimension determination operation 430 determines if the dimension variable dim equals the number of dimensions in the feature space plus 1. If the dimension variable dim does not equal the number of dimensions in the feature space plus 1, the operational flow 400 returns to the partition dimension operation 412. However, if the dimension variable dim does equal the number of dimensions in the feature space plus 1, the operational flow 400 ends.

Figure 5:
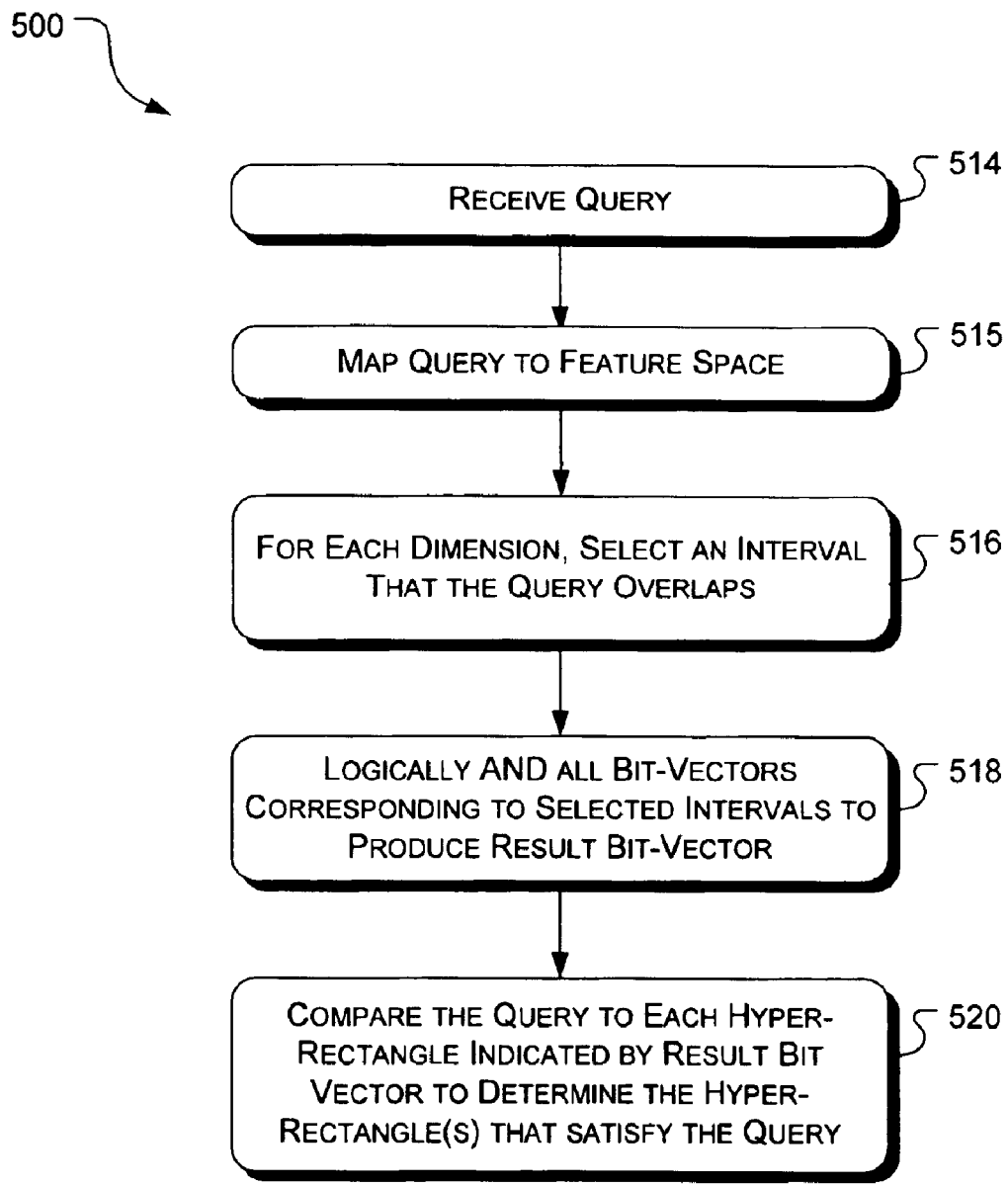
FIG. 5 is an exemplary operational flow diagram illustrating various operations that may be performed in searching the feature space of FIG. 2.

Turning now to FIG. 5, illustrated therein is an exemplary operational flow 500 that may be used in searching the feature space 110. More particularly, the operational flow 500 may be used in searching the feature space 110 after bit vector indices have been created for each of the intervals in the feature space 110, either in accordance with the operational flows 300 and/or 400, as described above, or by some other operations. As shown, at the beginning of the operational flow 500, a receive query operation 514 receives a query item. Next, a map query operation 515 maps that query item into a query point in the MD feature space.

Following the map query operation 515, and interval selection operation 516 selects an interval from each dimension that overlaps the query point. An interval in a dimension may be said to overlap a query point if the value of the query point in the dimension lies within the value range specified by the interval. Next, an ANDing operation 518 logically ANDs all of the bit vector indices corresponding to the intervals selected in the interval selection operation 516. This logical ANDing of the bit vector indices produces a single result bit vector index that specifies a set of hyper-rectangles that match the received query point. As will be appreciated, the set of hyper-rectangles specified by the result bit vector index will in most cases be significantly smaller than the set of all hyper-rectangles within the feature space 110.

Following the ANDing operation 518, a matching operation 520 compares the received query point to each of the hyper-rectangles indexed by 1s in the result bit vector index to determine which of these hyper-rectangles overlap the received query point. In the case where each of the hyper-rectangles is mapped from an associated MD data object, rather than comparing the received query point to each of the hyper-rectangles specified by the result bit vector index, the received query point may be compared directly to the MD data object associated with the hyper-rectangles indexed by 1s in the result bit vector index.

Figure 6:
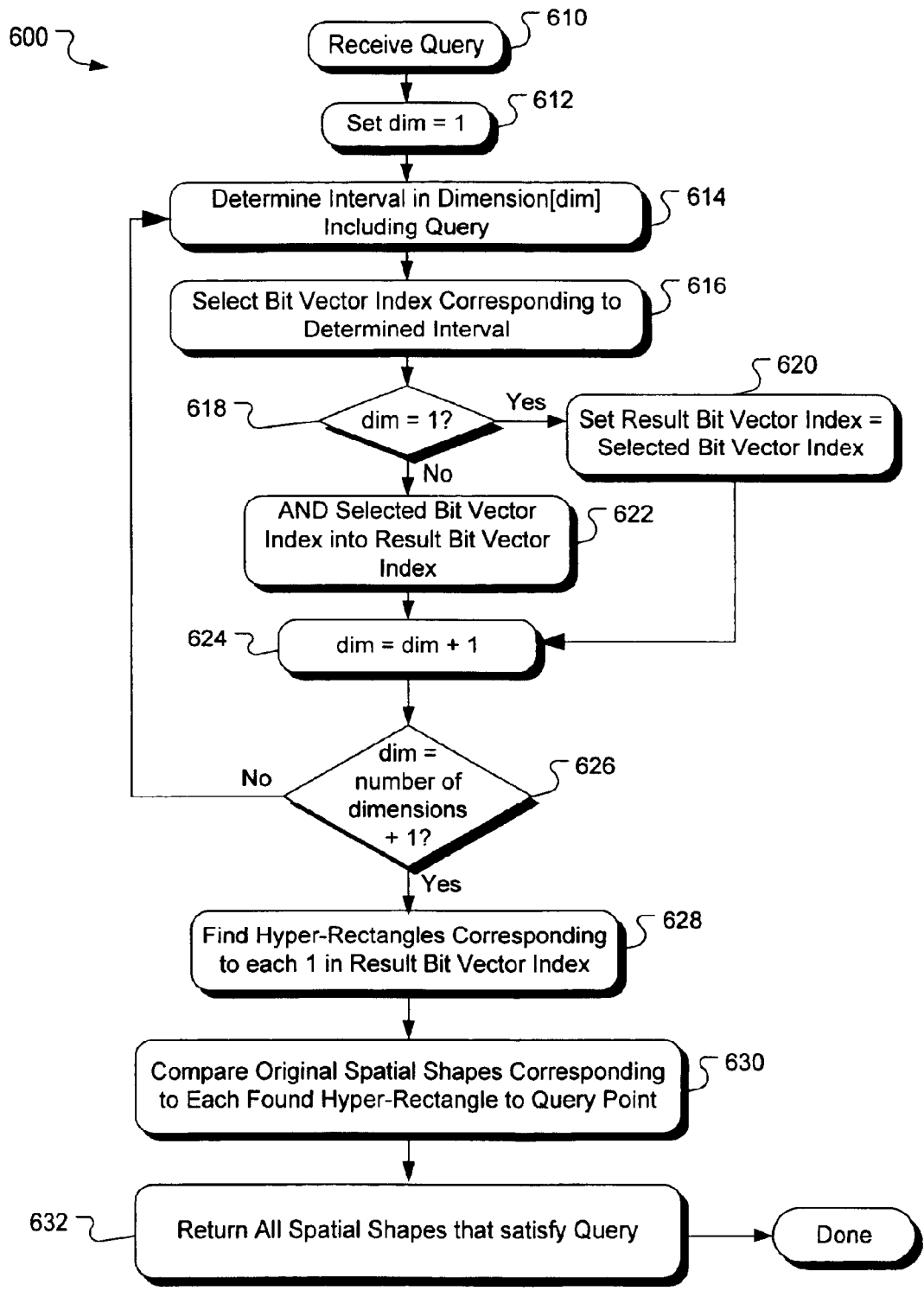
FIG. 6 is another exemplary operational flow diagram illustrating various operations that may be performed in searching the feature space of FIG. 2.

Turning now to FIG. 6, illustrated therein is another, more detailed exemplary operational flow 600 including operations that may be used for searching a feature space 110. As with the operational flow, the operational flow 600 may be carried out after bit vector indices have been created for each of the intervals in the feature space 110, whether in accordance with the operational flows 300 and/or 400, as described above, or by some other operations. As shown, at the beginning of the operational flow 600, a receive query operation 610 receives a query point. After a query point has been received, a set dimension operation 612 sets a dimension variable dim equal to 1. Next, a determine interval operation 614 determines an interval in the dimension specified by the dimension variable dim that includes the query point. Stated another way, interval operation 614 determines an interval in the dimension specified by the dimension variable dim that overlaps the query point. A select bit vector index operation 616 then selects the bit vector index corresponding to the interval determined in determine interval operation 614.

Following the select bit vector index operation 616, a dimension determination operation 618 determines if the dimension variable dim is equal to 1. If the dimension dim is equal to 1, a set result bit vector index operation 620 sets the result bit vector index equal to the bit vector index selected in the select bit vector index operation 616, and the operational flow proceeds to a dimension variable increment operation 624. However, if the dimension determination operation 618 determines that the dimension variable dim is not equal to 1, the operational flow 600 proceeds to an ANDing operation 622, where the bit vector index selected in the select bit vector index operation 616 is logically ANDed with, or into, the result bit vector. Next, the dimension variable increment operation 624 increments the dimension variable dim.

Following the dimension variable increment operation 624, a dimension determination operation 626 determines if the dimension variable dim equals the number of dimensions in the feature space. If the dimension variable dim does not equal the number of dimensions in the feature space, the operational flow 600 returns to the determined interval operation 614. However, if the dimension variable dim does equal the number of dimensions in the feature space, the operational flow proceeds to a find hyper-rectangle operation 628, where the hyper-rectangles corresponding to each "1" in the result bit vector are found. Next, a compare data object operation 630 compares the received query point to all of the MD data objects associated with the hyper-rectangles found by the fine hyper-rectangle operation 628. A return data object operation 630 then returns all MD data objects that match the received query point, and the operational flow 600 ends.

FIG. 7 illustrates one operating environment 710 in which the various systems, methods, and data structures described herein may be implemented. The exemplary operating environment 710 of FIG. 7 includes a general purpose computing device in the form of a computer 720, including a processing unit 721, a system memory 722, and a system bus 723 that operatively couples various system components include the system memory to the processing unit 721. There may be only one or there may be more than one processing unit 721, such that the processor of computer 720 comprises a single central-processing unit (CPU), or a plurality of processing units, commonly referred to as a parallel processing environment. The computer 720 may be a conventional computer, a distributed computer, or any other type of computer.

The system bus 723 may be any of several types of bus structures including a memory bus or memory controller, a peripheral bus, and a local bus using any of a variety of bus architectures. The system memory may also be referred to as simply the memory, and includes read only memory (ROM) 724 and random access memory (RAM) 725. A basic input/output system (BIOS) 726, containing the basic routines that help to transfer information between elements within the computer 720, such as during start-up, is stored in ROM 724. The computer 720 further includes a hard disk drive 727 for reading from and writing to a hard disk, not shown, a magnetic disk drive 728 for reading from or writing to a removable magnetic disk 729, and an optical disk drive 730 for reading from or writing to a removable optical disk 731 such as a CD ROM or other optical media.

The hard disk drive 727, magnetic disk drive 728, and optical disk drive 730 are connected to the system bus 723 by a hard disk drive interface 732, a magnetic disk drive interface 733, and an optical disk drive interface 734, respectively. The drives and their associated computer-readable media provide nonvolatile storage of computer-readable instructions, data structures, program modules and other data for the computer 720. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 729, optical disk 731, ROM 724, or RAM 725, including an operating system 735, one or more application programs 736, other program modules 737, and program data 738. A user may enter commands and information into the personal computer 720 through input devices such as a keyboard 40 and pointing device 742. Other input devices (not shown) may include a microphone, joystick, game pad, satellite dish, scanner, or the like. These and other input devices are often connected to the processing unit 721 through a serial port interface 746 that is coupled to the system bus, but may be connected by other interfaces, such as a parallel port, game port, or a universal serial bus (USB). A monitor 747 or other type of display device is also connected to the system bus 723 via an interface, such as a video adapter 748. In addition to the monitor, computers typically include other peripheral output devices (not shown), such as speakers and printers.

The computer 720 may operate in a networked environment using logical connections to one or more remote computers, such as remote computer 749. These logical connections may be achieved by a communication device coupled to or a part of the computer 720, or in other manners. The remote computer 749 may be another computer, a server, a router, a network PC, a client, a peer device or other common network node, and typically includes many or all of the elements described above relative to the computer 720, although only a memory storage device 750 has been illustrated in FIG. 7. The logical connections depicted in FIG. 7 include a local-area network (LAN) 751 and a wide-area network (WAN) 752. Such networking environments are commonplace in office networks, enterprise-wide computer networks, intranets and the Internal, which are all types of networks.

When used in a LAN-networking environment, the computer 720 is connected to the local network 751 through a network interface or adapter 753, which is one type of communications device. When used in a WAN-networking environment, the computer 720 typically includes a modem 754, a type of communications device, or any other type of communications device for establishing communications over the wide area network 752. The modem 754, which may be internal or external, is connected to the system bus 723 via the serial port interface 746. In a networked environment, program modules depicted relative to the personal computer 720, or portions thereof, may be stored in the remote memory storage device. It is appreciated that the network connections shown are exemplary and other means of and communications devices for establishing a communications link between the computers may be used.

Various systems and methods have been set forth that may be used in, or in conjunction with various searching methods using hyper-rectangles and bit vector indices. The systems, methods, and data structures have been described as incorporating various elements or operations recited in the appended claims. It should be understood, however, that the preceding description is not intended to limit the scope of this patent. Rather, the inventors have contemplated that the claimed systems, methods, and data structures might also be embodied in other ways, to include different operations or elements, or combinations of operations or elements, similar to the ones described, in conjunction with other present or future technologies.

What is claimed is:

1. A data mapping method executed by a computing device, comprising:
    partitioning each dimension in a multidimensional (MD) feature space into a plurality of intervals;
    identifying an interval in each dimension that overlaps a query point;
    finding one or more MD data objects coupled to the MD feature space that match all of the identified intervals; and
    evaluating a first MD data object that matches all of the identified intervals to determine whether the first MD data object overlaps the query point,
    wherein the finding includes,
    for each interval, forming an associated data structure that indicates the MD data objects that match the interval; and
    processing each data structure associated with an identified interval to produce a set of MD data objects, each MD data object in the set matching each of the identified intervals.

2. A method as defined in claim 1, wherein each data structure comprises a bit vector index.

3. A method as defined in claim 2, wherein each bit vector index comprises a plurality of bits and wherein each bit in a bit vector corresponds to a single MD data object.

4. A method as defined in claim 3, wherein a hyper-rectangle is associated with each MD data object and wherein each bit in a bit vector index indicates whether the hyper-rectangle corresponding thereto overlaps the corresponding interval 5. A method as defined in claim 2, wherein the act of processing comprises logically ANDing the bit vector indices associated with all selected intervals.

6. A computer-readable medium having computer-executable instructions for performing acts comprising:
    partitioning each of a plurality of dimensions in a multi-dimensional (MD) feature space into a plurality of intervals;
    for each interval, forming an associated data structure that indicates which of a plurality of MD data objects coupled to the MD feature space match the interval;
    receiving a query point and selecting an interval in each dimension that is overlapped by the query point;
    processing each data structure associated with a selected interval to determine a set of MD data objects; and
    determining a subset of the MD data objects that overlap the query point.

7. A computer-readable medium as defined in claim 6, wherein each data structure comprises a bit vector index.

8. A computer-readable medium as defined in claim 7, wherein the act of processing comprises logically ANDing all of the bit vector indices to determine the set of MD data objects.

9. A computer-readable medium as defined in claim 8, wherein each bit vector index has a plurality of bits and each bit in a bit vector corresponds to a MD data object coupled to the MD feature space.

10. A computer-readable medium as defined in claim 7, wherein each bit vector index has a plurality of bits, each bit in a bit vector corresponds to a single hyper-rectangle and indicates whether the corresponding hyper-rectangle overlaps the interval associated with the data structure.

11. A computer-readable medium as defined in claim 7, wherein the act of partitioning comprises partitioning each dimension into a number of disjoint intervals.

12. A computer-readable medium as defined in claim 6, wherein at least one interval is bounded by two interval dividers.

13. A computer-readable medium as defined in claim 6, wherein at least one interval is unbounded in one direction along a dimension.

14. A computer-readable medium as defined in claim 6, wherein at least one interval of a first of the plurality of dimensions is bound by an interval dividers and wherein the at least one interval divider is selected in accordance with $FirstIDsj = j*[(2*|S|)/m]+j$, where FirstIDsj represents the location of the at least one interval divider along the first dimension, m is a selected number of interval dividers along the first dimension, $1<=j<=(2*|S|)\% \ m$, and $|S|$ equals a number of hyper-rectangles coupled to the MD feature space.

15. A computer-readable medium as defined in claim 6, wherein at least one interval of a first of the plurality of dimensions is bound by an interval divider and wherein the at least one interval divider is selected according to $RemainingIDsj = j*[(2*|S|)/m]=(2*|S|)\% \ m$, where RemainingIDsj represents the location of the interval divider along the first dimension, m is a selected number of interval dividers along the first dimension, $(2*|S|)\% \ m+1<=j<=m$, and $|S|$ equals a number of hyper-rectangles coupled to the MD feature space.

* * * * *

UNITED STATES PATENT AND TRADEMARK OFFICE
CERTIFICATE OF CORRECTION

PATENT NO. : 6,941,315 B2
APPLICATION NO. : 10/602438
DATED : September 6, 2005
INVENTOR(S) : Jonathan D. Goldstein et al.

It is certified that error appears in the above-identified patent and that said Letters Patent is hereby corrected as shown below:

Title Page;

On the face page, in field (56), under "Other Publications" in column 2, line 10, delete "Glsli" and insert -- Gisli --, therefor.

On page 2, in field (56), under "Other Publications" in column 1, lines 9-10, delete "Qantitative" and insert -- Quantitative --, therefor.

In column 7, line 57, after "respect" delete "s".

In column 12, line 24, in Claim 4, after "interval" insert -- . --.

In column 12, line 48, in Claim 9, delete "claim 8" and insert -- claim 7 --, therefor.

In column 12, line 57, in Claim 11, delete "claim 7" and insert -- claim 6 --, therefor.

In column 13, line 3, in claim 14, delete "FirstIDsj" and insert -- FirstIDs$_j$ --, therefor.

In column 13, line 3, in claim 14, after "where" delete "FirstIDsj" and insert -- FirstIDs$_j$ --, therefor.

In column 14, line 3, in Claim 15, delete "RemainingIDsj" and insert -- RemainingIDs$_j$ --, therefor.

In column 14, line 3, in Claim 15, after "m]" delete "=" and insert -- + --, therefor.

UNITED STATES PATENT AND TRADEMARK OFFICE
CERTIFICATE OF CORRECTION

PATENT NO. : 6,941,315 B2
APPLICATION NO. : 10/602438
DATED : September 6, 2005
INVENTOR(S) : Jonathan D. Goldstein et al.

It is certified that error appears in the above-identified patent and that said Letters Patent is hereby corrected as shown below:

In column 14, lines 3-4, in Claim 15, after "where" delete "RemainingIDs$j$" and insert -- RemainingIDs$_j$ --, therefor.

Signed and Sealed this

Eleventh Day of August, 2009

David J. Kappos
*Director of the United States Patent and Trademark Office*